W. H. LEONARD.
QUICK COUPLING.
APPLICATION FILED NOV. 8, 1909.
974,501.
Patented Nov. 1, 1910.
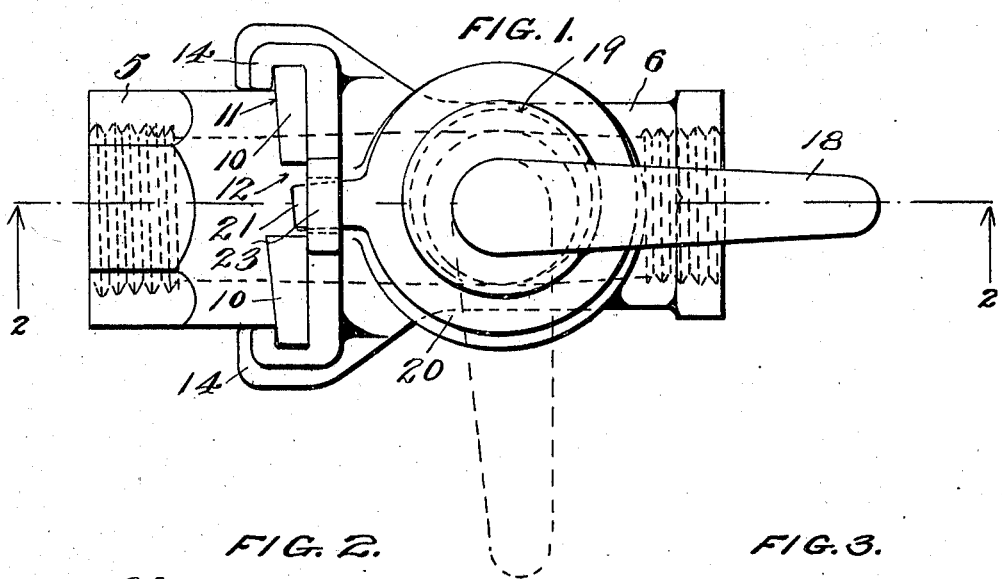
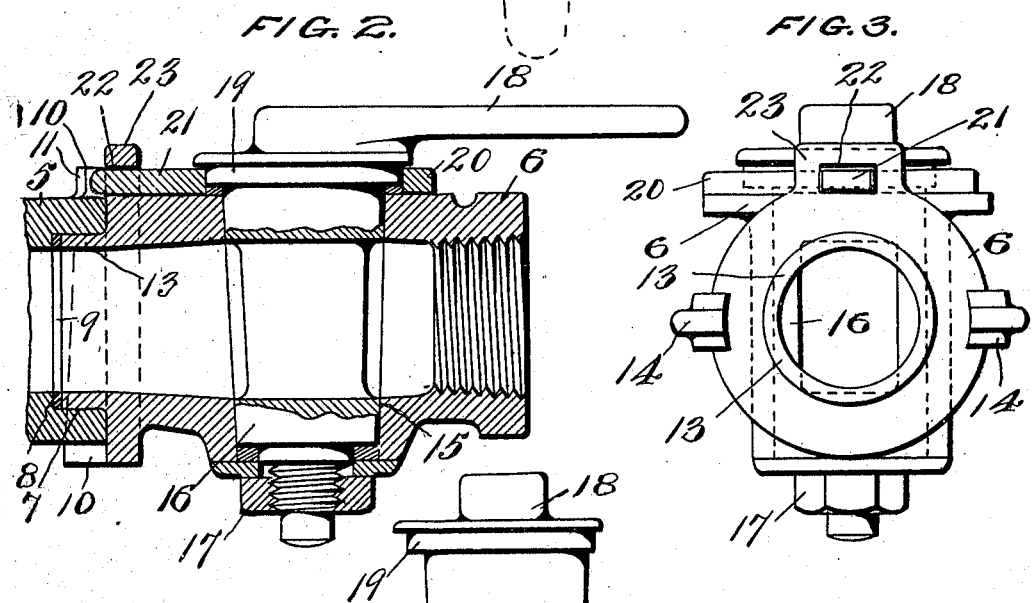
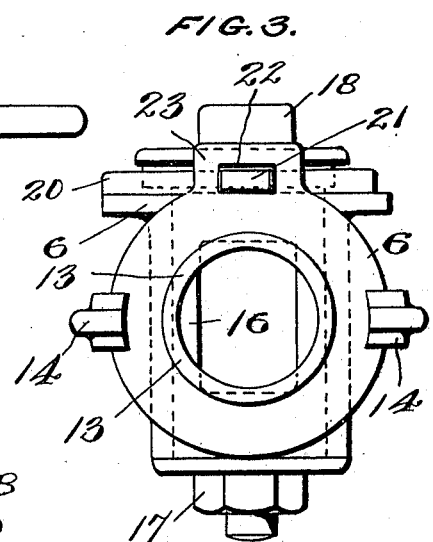
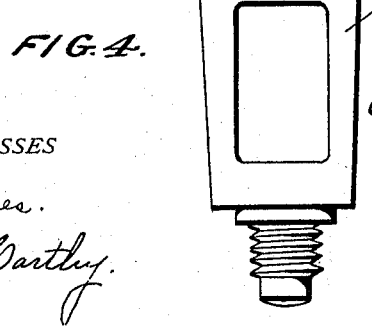
WITNESSES
C. K. Davies.
E. G. McCarthy.
William H. Leonard
INVENTOR
by
B. J. Foster
Attorney

UNITED STATES PATENT OFFICE.

WILLIAM H. LEONARD, OF DENVER, COLORADO, ASSIGNOR TO THE DENVER ROCK DRILL & MACHINERY COMPANY, OF DENVER, COLORADO.

QUICK COUPLING.

974,501.  Specification of Letters Patent.  Patented Nov. 1, 1910.

Application filed November 8, 1909. Serial No. 526,712.

*To all whom it may concern:*

Be it known that I, WILLIAM H. LEONARD, a citizen of the United States, residing at Denver, in the county of Denver and State of Colorado, have invented certain new and useful Improvements in Quick Couplings, of which the following is a specification.

In rock drilling and like mechanisms where air or other motive fluid, under pressure, is employed, it is very desirable to have quick coupling means, inasmuch as it is often necessary to uncouple the supply hose from the mechanism for various purposes. Heretofore, however, in so far as I am aware, the use of quick couplings has not been practicable, because of the danger of their accidental uncoupling when the motive fluid is turned on, the hose pipes being under almost constant movement, and therefore tending to effect the relative rotation between the coupling elements. In case the pipe should become suddenly uncoupled when the air or motive fluid, under pressure, is in the same, there is liability of the coupling flying up and striking the workmen with a consequent danger of injury and damage.

One of the primary objects of the present invention is to provide a quick coupling, in which the danger is entirely obviated, making it peculiarly useful for purposes above set forth.

An embodiment of the invention that has proven entirely practicable is illustrated in the accompanying drawings, wherein:—

Figure 1 is a top plan view of said coupling. Fig. 2 is a longitudinal sectional view on the line 2—2 of Fig. 1. Fig. 3 is an end elevation of the element carrying the valve. Fig. 4 is a view in elevation of the valve.

Similar reference numerals designate corresponding parts in all the figures of the drawings.

In the embodiment disclosed, the coupling comprises two elements, designated respectively 5 and 6. The element 5 is provided in one end with a counterbore 7, forming an internal shoulder 8 for a packing gasket or ring 9. This end is also provided with external wedge portions 10, the rear faces 11 of which are inclined. It will be observed that the wedge portions are spaced apart, as shown at 12. The other element 6 has a tubular extension 13 that fits into the counterbore 7 against the packing gasket 9, and is furthermore provided with projecting hooks 14 that are arranged to pass between the wedge portions 10 and bear against the inclined faces 11 thereof, when the elements are placed together and relatively rotated. These elements therefore produce a quick coupling, which is very effective, but so far as described, are liable to accidental relative retrograde rotation and consequent uncoupling.

In the present embodiment, the coupling element 6 is provided with a transversely tapered valve seat 15, in which is located a rotary valve 16 suitably secured in place by a nut 17, and having an exposed transversely arranged handle 18, by means of which the valve can be turned to opened or closed position. This valve is also provided just inside the handle with an eccentric 19, and surrounding said eccentric is a ring 20, forming a part of a bolt 21, slidably mounted on one side of the coupling element 6. The free end of the bolt operates through a keeper opening 22, formed in an enlargement 23, and said bolt is movable to and from a position between the wedges 10 of the coupling element 5, as will be clear by reference to Fig. 1. The arrangement of the eccentric is such that when the valve is in its closed position with the handle in the position indicated in dotted lines in figure, the free end of the bolt is located in the enlargement 23. Therefore the coupling elements can be relatively rotated and coupled or uncoupled, as desired. When they are in coupled condition, however, and the valve is turned to open position, the eccentric will cause the bolt to be projected to a position between the wedges, as shown in Fig. 1, whereupon relative rotation of the elements to a material degree is positively prevented. It will be noted furthermore that with the arrangement, as illustrated, while the bolt will be inoperative when the valve is closed and the handle is in the position shown in dotted lines, the coupling is always locked when the valve is opened, whether the handle is in the position shown in full lines, or in a diametrically opposite position. Also it will be seen that if the valve is closed and the handle is disposed diametrically opposite to the position indicated in dotted lines, still the coupling will be locked against uncoupling.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new and desire to secure by Letters Patent, is:—

1. In a quick coupling of the character set forth, the combination with coacting coupling elements having detachably associated coacting devices for securing them together, of a valve in one of the elements, means for operating the valve, and a device mounted on the element having the valve and actuated on the movement of such valve to a predetermined position to maintain the securing devices in coacting relation and thereby hold the coupling elements against uncoupling.

2. In a quick coupling of the character set forth, the combination with coacting coupling elements, of a valve in one of the elements, and a bolt automatically actuated on the movement of the valve to a predetermined position to lock the coupling elements against uncoupling.

3. In a quick coupling of the character set forth, the combination with coacting coupling elements, of a valve in one of the elements, and a bolt slidably mounted on the coupling element having the valve and automatically actuated on the movement of the valve to a predetermined position to lock the coupling elements against uncoupling.

4. In a quick coupling of the character set forth, the combination with coacting coupling elements, of a rotary valve in one of the elements, and a sliding bolt engaged with and operated by the valve to lock the elements against uncoupling.

5. In a quick coupling of the character set forth, the combination with coacting coupling elements having detachably interlocked devices for securing them together, of a rotary valve in one of the elements, said valve having an eccentric, and means engaged with the eccentric for preventing the interlocked devices of the coupling elements from becoming detached.

6. In a quick coupling of the character set forth, the combination with coacting coupling elements, of a rotary valve in one of the elements, said valve having an eccentric, and a bolt mounted on the element having the valve and having a ring surrounding the eccentric.

7. In a quick coupling of the character set forth, the combination with coupling elements, one of said elements having spaced wedges, the other having hooks that pass between and engage over the wedges, a rotary valve arranged in the latter element and having an eccentric, and a bolt slidable on the said latter element and having a ring surrounding the eccentric, said bolt being movable to a position between the wedges when the valve is turned to a predetermined position.

8. In a quick coupling of the character set forth, the combination with detachably associated coupling elements, of a valve in one of the elements movable to two closed positions, and means operated by the valve for locking the elements against uncoupling, said means permitting the uncoupling of the elements when the valve is in one of its closed positions, and retaining the coupling elements locked against uncoupling when in the other of its closed positions.

9. In a quick coupling of the character set forth, the combination with detachably associated coupling elements, one of the elements having spaced wedges, the other having hooks that pass between and engage over the wedges, a bolt mounted on one element and movable into and out of engagement with the other to prevent their relative turning, and an eccentric rotatably mounted on the element carrying the bolt and engaging said bolt to actuate it.

10. In a quick coupling of the character set forth, the combination with relatively rotatable detachably associated coupling elements, one of which is provided with spaced wedges, the other having hooks that pass between and engage over the wedges, of a valve rotatably mounted on the latter element and having an eccentric, and a bolt slidably mounted on the said latter element and movable to and from a position between the wedges, said bolt having a ring surrounding the eccentric.

In testimony whereof, I affix my signature in presence of two witnesses.

WILLIAM H. LEONARD.

Witnesses:
A. H. SKAER,
H. E. FISKE.